May 15, 1928.
R. VON SCHEVEN
OIL LEVEL INDICATOR FOR AUTOMOBILES
Filed Sept. 30, 1926
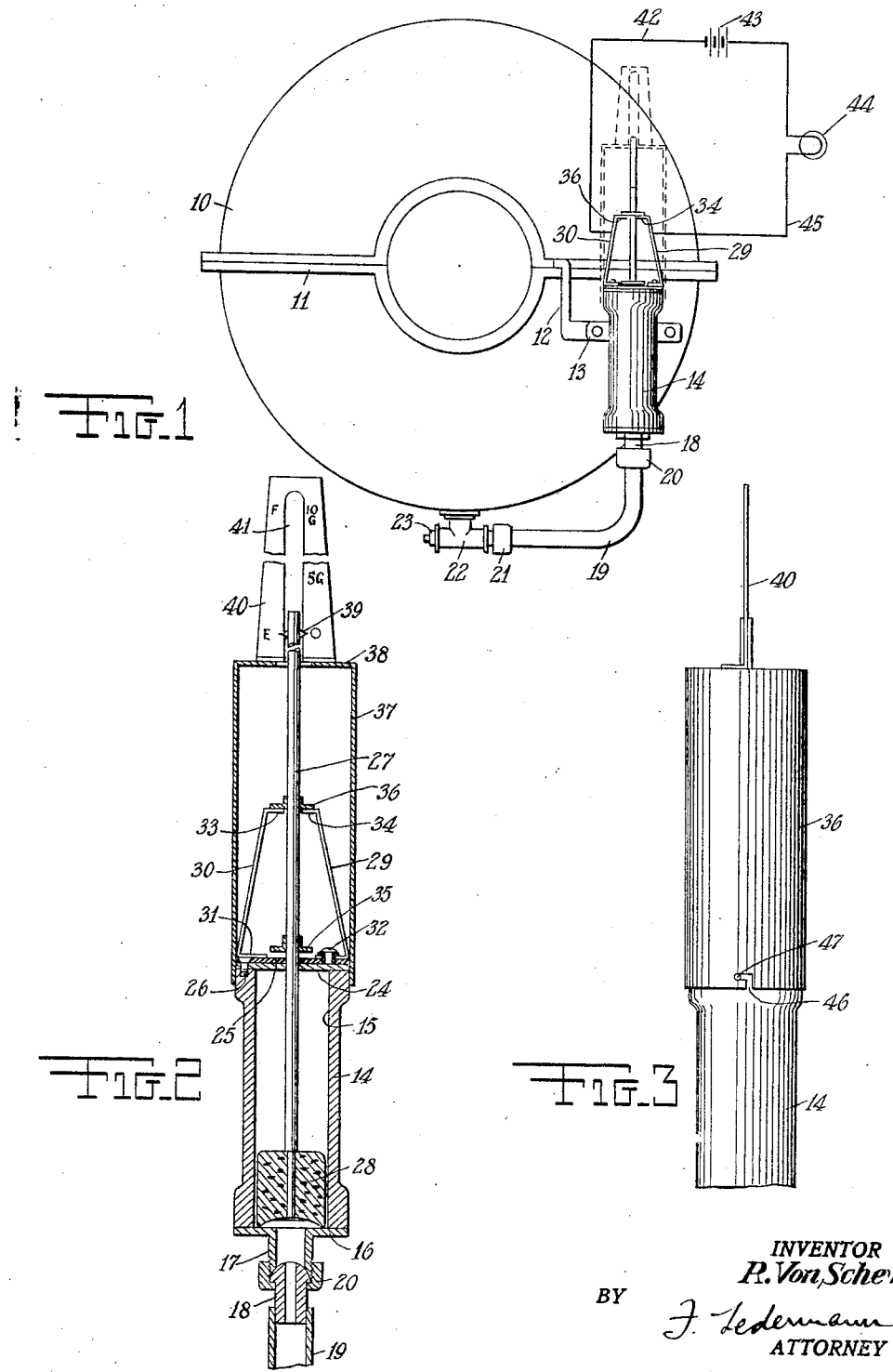
INVENTOR
R. Von Scheren
BY
J. Lederman
ATTORNEY Patented May 15, 1928.

1,669,684

UNITED STATES PATENT OFFICE.

RICHARD von SCHEVEN, OF BROOKLYN, NEW YORK.

OIL-LEVEL INDICATOR FOR AUTOMOBILES.

Application filed September 30, 1926. Serial No. 138,723.

The main object of this invention is to provide an indicator for the crank cases of automobiles having the purpose of indicating whether the crank case is entirely drained of oil or sufficiently full.

Another object is to provide an indicator equipped with a colored light, which light is illuminated thru an electrical circuit when an empty or full level has been reached.

Still another object is to provide an indicator having means thereon for closing an electrical circuit when oil in the crank case has fallen to a low level or has been completely filled to the working level, and additional means consisting of a scale and plunger, which visibly indicates the quantity of oil in the crank case.

The above and other objects will become apparent in the description below, in which characters of reference refer to like-named parts in the drawing.

Referring briefly to the drawing, Figure 1 is an end elevational view of a crank of an automotive engine, showing the indicator mounted in place thereon.

Figure 2 is a longitudinal sectional elevational view of the indicator, showing the position of the mechanism when the crank case is empty.

Figure 3 is a fragmentary sectional side elevational view of the exterior of Figure 2.

Referring in detail to the drawing, the numeral 10 indicates the lower half of a crank case. The flange 11 surmounting this lower half of the crank case supports an arm 12 of a saddle bracket 13 on which the entire indicating device is mounted in any desired manner. The oil indicator comprises a vertical cylinder 14 having a bore 15 passing entirely thru it. The lower end of the cylinder is closed by a cap 16 from which a threaded nipple 17 extends downwardly. A shoulder nipple 18 seats upon the lower face of the nipple 17, is joined to a length of pipe 19 and is secured in place by a threaded union 20 which engages the threads of the nipple 17. This pipe line 19 at its opposite end is joined by a union 21 to a T-fixture 22 whose arm is coupled to the lower level of the crank case 10. The remaining arm of the T-fixture 22 is provided with a drain plug 23 which may be removed when draining the crank case of oil. The upper end of the cylinder 14 is closed by an annular plate 24 in which an axial opening is formed. An insulating disk 25 is seated upon the plate 24 and the disk and plate are secured to said cylinder by screws 26. The disk is also provided with an axial opening and thru the aligned openings of the disk 25 and plate 24, a relatively long rod 27 passes. The lower end of the rod 27 extends into the bore 15 of the cylinder 14 and has a reduced lower end to which a cork or similar buoyant plunger 28 is secured.

The disk 25 supports a pair of upwardly extending metallic fingers 29 and 30. The lower ends of these fingers are provided with ears 31 which extend toward each other from diametrically opposite positions on the disk 25 and thru these ears, rivets 32 pass which latter secure the ears to the insulating disk 25. The fingers extend upwardly convergently and at their upper ends are provided with tongues 33 and 34, which tongues extend toward each other on opposite sides of the rod 27, it being noted that the latter is slidable between said tongues to separate it from said tongues by a gap. A contact disk 35 is fixed to the rod 27 at a position immediately above the insulator disk 25 and an additional contact disk 36 is mounted on the rod 27 above the disk 35 in such position that when the plunger 28 is resting upon the cap 16, the contact disk 36 will be seated upon the tongues 33 and 34 and the lower disk 35 is mounted on the rod 27 a distance apart from the disk 36 which corresponds to the distance of fall of the plunger 28 within the bore 15 the cylinder 14. A shell 37 completely encloses the greater portion of the rod 27 which projects normally from the cylinder 14, the fingers 29 and 30 and contact disks 35 and 36. This shell is of a height equal to twice that of the movement of the plunger 28 in the cylinder 14 and is covered by a roof 38. The extreme upper end of the rod 27 passes thru an axial opening in the roof 38 of the shell 37 when the plunger is at rest in the bottom of the cylinder 14, as illustrated in Figure 2, and is provided with indicator elements 39 which project in opposite directions. A dial 40 is mounted in the roof of the shell 38 and is provided with a channel 41 in which the upper end of the rod 27 is movable. The face of this dial is provided with characters which indicate on one side whether the crank case is full or empty and at the opposite side of the bar 27, the amount of oil in the crank case is indicated by the use of figures.

The finger 30 has a lead wire 42 joined to it at some desirable position. This lead wire extends and is coupled to a battery of cells 43 from which it extends to a filament lamp 44. The opposite terminal of the filament lamp is connected to the finger 29 by a lead wire 45, completing a circuit thru both fingers 29 and 30 when either of the contact disks 35 or 36 are in engagement with the tongues 33 and 34 of said fingers.

The device is adapted to indicate the amount of oil in a crank case by means of either a light actuated by a circuit coupled to the fingers 29 and 30, or by a scale which cooperates with pointers at the upper end of the rod 27. When the crank case is empty and oil is being poured thereinto, the oil from said crank case passes thru the T-fixture 22 and pipe 19 and enters into the bore 15 of the cylinder. As the level of the oil in the cylinder 14 rises, the buoyant plunger 28 is lifted, thereby raising the rod 27. Originally, when the crank case is completely empty, the contact disks 36 rest upon the surface of the tongues 33 and 34 and in this manner closes a circuit thru the lead wires 42 and 45 to the filament lamp 44, which is illuminated, indicating that the crank case is being refilled, the rod rises in the manner described. The operator continues to flood the crank case with oil until the filment lamp 44 is again illuminated, this time by the contact disk 35 which engages the under-side of the tongues 33 and 34, in this manner closing the circuit thru the leads 42 and 45, thus disclosing to the operator that the crank case has been filled to the required level. When not desiring to use the illuminating means for signalling to the operator that the crank case is full or empty, the dial may be used. This dial 40 cooperates with the pointers 39. As the pointers are opposite the letter "E" on one side of the dial plate, it discloses that the crank case is completely empty. Should a person desire to fill oil into the crank case to an intermediate level between full and empty, the opposite side of the dial 41 is used, as this side has characters thereon indicating the volume of oil at that time in the crank case. The shell 37 is secured to the cylinder 14 thru the cooperation of a bayonet slot 46 formed in said shell and a pin 47 mounted and projecting from the wall of the cylinder 14.

It is to be noted that certain changes in form and construction may be made without departing from the spirit and scope of the invention.

I claim:—

1. In an oil level indicator, a vertical cylinder, a buoyant plunger slidable therein, said cylinder being closed at both ends, a rod projecting from said plunger upwardly out of said cylinder, fingers extending upwardly from said cylinder and insulated therefrom, an electrical circuit joined in series to said fingers, said fingers being separated by a gap, tongues projecting toward each other formed integral with said fingers, the rod being slidable vertically between said tongues, a pair of contact disks mounted rigidly on said rod above said cylinder, said disks seating on said tongues for closing an electrical circuit thru said tongues, a cylindrical shell releasably attached to said cylinder, a tapering scale seated on said shell having a channel therein receiving said rod.

2. In an oil level indicator, a vertical cylinder, a buoyant plunger slidable therein, said cylinder being closed at both ends, a rod projecting from said plunger upwardly out of said cylinder, fingers extending upwardly from said cylinder and insulated therefrom, an electrical circuit joined in series to said fingers, said fingers being separated by a gap, tongues projecting toward each other formed integral with said fingers, the rod being slidable vertically between said tongues, a pair of contact disks mounted rigidly on said rod above said cylinder, said disks seating on said tongues for closing an electrical circuit thru said tongues, one of said contact disks being mounted above said tongues, the opposite disk being mounted beneath said tongues, the distance between said disks being equivalent to the movement of said plunger, a shell surmounting said cylinder and being removably attached to the latter, a vertical scale seated on said shell having a vertical channel therein, the rod being movable in said channel.

3. In an oil level indicator, a vertical cylinder, a buoyant plunger slidable therein, said cylinder being closed at both ends, a rod projecting from said plunger upwardly out of said cylinder, fingers extending upwardly from said cylinder and insulated therefrom, an electrical circuit joined in series to said fingers, said fingers being separated by a gap, tongues projecting toward each other formed integral with said fingers, the rod being slidable vertically between said tongues, a pair of contact disks mounted rigidly on said rod above said cylinder, said disks seating on said tongues for closing an electrical circuit thru said tongues, one of said contact disks being mounted above said tongues, the opposite disk being mounted beneath said tongues, the distance between said disks being equivalent to the movement of said plunger, a shell mounted on said cylinder enclosing the entire structure, a scale mounted on said shell, said rod passing thru said shell, and a pointer on said rod cooperating with the scale for indicating the volume of liquid in said cylinder.

In testimony whereof I affix my signature.

RICHARD von SCHEVEN.